United States Patent

Wang

(10) Patent No.: US 8,351,796 B2
(45) Date of Patent: Jan. 8, 2013

(54) OPTICAL LOW-NOISE BLOCK DOWNCONVERTER, MULTIPLE DWELLING UNIT, AND RELATED SATELLITE TELEVISION SYSTEM

(75) Inventor: Che-Ming Wang, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 320 days.

(21) Appl. No.: 12/818,132

(22) Filed: Jun. 17, 2010

(65) Prior Publication Data

US 2011/0283330 A1 Nov. 17, 2011

(30) Foreign Application Priority Data

May 13, 2010 (TW) .............................. 99115292 A

(51) Int. Cl.
*H04B 10/12* (2006.01)
(52) U.S. Cl. .................. 398/163; 398/141; 398/152
(58) Field of Classification Search .................. 398/65, 398/74, 91, 115–116, 141, 152, 163
See application file for complete search history.

(56) References Cited

U.S. PATENT DOCUMENTS 6,643,464 B1 * 11/2003 Roorda et al. .................. 398/59
2010/0150566 A1 * 6/2010 Soto et al. ..................... 398/115

FOREIGN PATENT DOCUMENTS

WO WO 2007096617 A2 8/2007

* cited by examiner

*Primary Examiner* — Leslie Pascal
(74) *Attorney, Agent, or Firm* — Winston Hsu; Scott Margo

(57) ABSTRACT

A low-noise block downconverter includes a first down-converting circuit for down-converting and filtering a first polarization signal for outputting a first intermediate-frequency signal, a second down-converting circuit for down-converting and filtering a second polarization signal for outputting a second intermediate-frequency signal, wherein a frequency band of the first intermediate-frequency signal is the same as that of the second intermediate-frequency signal, an oscillator for generating an oscillating signal, outputted to the first down-converting circuit and the second down-converting circuit, a first optical transmitter coupled to the first down-converting circuit for converting the first intermediate-frequency signal into a first optical signal, and a second optical transmitter coupled to the second down-converting circuit for converting the second intermediate-frequency signal into a second optical signal.

17 Claims, 10 Drawing Sheets

OPTICAL LOW-NOISE BLOCK DOWNCONVERTER, MULTIPLE DWELLING UNIT, AND RELATED SATELLITE TELEVISION SYSTEM

BACKGROUND OF THE INVENTION

1. Field of the Invention

The present invention relates to an optical low-noise downconverter, multiple dwelling unit, and related satellite television system, and more particularly, to an optical low-noise downconverter, multiple dwelling unit, and related satellite television system of low cost.

2. Description of the Prior Art

Satellite communication has several advantages, such as a wide coverage, low terrestrial interference, etc. For a satellite television (TV) broadcast system, the satellite TV broadcast system can provide users with various TV channels of high definition quality. Please refer to FIG. 1, which is a schematic diagram of a conventional satellite TV system 10. The satellite TV system 10 is a satellite master antenna television system suitable to a building or community, and each user in the building or community can receive satellite signals, such as 10.7-12.75 GHz Ku band satellite signals, through a master antenna. In the satellite TV system 10, the satellite signals are received by a satellite receiver 100, down-converted into an intermediate-frequency (IF) signal with a frequency band range of 0.95-2.15 GHz, and transmitted to a plurality of decoding devices 104 (such as set top boxes) of end users via a multiswitch 102, so as to be decoded. Under such a situation, all of the end users in the building or community can watch various satellite TV programs via a display device 106, such as a TV set. In addition, a terrestrial TV broadcasting signal is received by an antenna 108 and transmitted to the end-users via the multiswitch 102.

The satellite receiver 100 includes a dish reflector 110 and a low-noise block downconverter with feedhorn (LNBF) 112. The LNBF 112 includes a feedhorn antenna, an orthomode transducer (OMT), and a low-noise block down-converter (LNB). The feedhorn antenna is utilized for receiving a satellite signal reflected by the dish reflector 110, and the OMT is utilized for separating the satellite signal into a vertical and a horizontal polarization signals, outputted to the LNB. The LNB down-converts the vertical and horizontal polarization signals into four IF signals with different frequency bands, including a vertical low polarization signal VL, a vertical high polarization signal VH, a horizontal low polarization signal HL, and a horizontal high polarization signal HH, outputted to the multiswitch 102. A signal is transmitted from the satellite receiver 100 to the decoding device 104 of the end-user via a coaxial cable. In recent years, optic fiber cables are substituted for coaxial cables in parts of satellite TV systems, for significantly reducing transmission loss and satisfying the public with satellite TV programs of high definition quality.

Please refer to FIG. 2, which is a schematic diagram of a conventional satellite TV system 20. The satellite TV system 20 can simultaneously receive satellite signals from a plurality of satellites and transmit the satellite signals via optical fibers. Each of satellite receivers 200_1-200_N respectively receives a satellite signal transmitted from different satellites, down-converts the satellite signal into an IF signal, converts the IF signal into an optical signal, and transmits the optical signal to a headend equipment 202 for signal processing, such as demodulation or mixing. A signal outputted from the headend equipment 202 is transmitted to a multiple dwelling unit (MDU) 206 via a splitter 204. The signal is transmitted from the headend equipment 202 to the MDU 206 via an optical fiber cable. The MDU 206 includes tens of output ports and is set in a building or community with high density end-users. The MDU 206 is utilized for converting an optical signal into an electric signal as well as down-converting the electric signal for generating a signal being received by a decoding device 208 of the end-user. For conveniently illustrating, only the splitter 204, the MDU 206, and the decoding device 208 are notated in FIG. 2. In practice, as shown in FIG. 2, the headend equipment 202 is connected to a plurality of splitters, each splitter is connected to a plurality of MDUs, and each MDU is connected to a plurality of decoding devices of end-users.

In the satellite TV system 20, the LNBF uses an optical LNB for meeting the characteristic of optical fiber transmission, and the MDU 206 is designed to conform with the optical fiber transmission as well. Please refer to FIG. 3, which is a schematic diagram of a conventional optical LNB 30 that conforms to the universal LNB specification. In the optical LNB 30, a vertical polarization signal SV is transmitted and processed through a low-noise amplifier 300, a band-pass filter 302 with a passband range of 10.7-12.75 GHz, a mixer 304 for mixing the transmitted vertical polarization signal SV with a 9.75 GHz oscillating signal generated by an oscillator 306, a band-pass filter 308 with a passband range of 0.95-3.0 GHz, and an IF amplifier 310, for outputting an IF signal IF1. A horizontal polarization signal SH is transmitted and processed through a low-noise amplifier 312, a band-pass filter 314 with a passband range of 10.7-12.75 GHz, a mixer 316 for mixing the transmitted horizontal polarization signal SH with a 7.3 GHz oscillating signal generated by an oscillator 318, a band-pass filter 320 with a passband range of 3.4-5.45 GHz, and an IF amplifier 322, for outputting an IF signal IF2. The IF signals IF1 and IF2 are converted into optical signals by an optical transmitter 324 and transmitted via an optical fiber. From the above, the optical LNB 30 spreads the spectrum of the vertical and horizontal polarization signals inputted to the optical LNB 30 and transmit the vertical and horizontal polarization signals in different frequency bands.

Please refer to FIG. 4, which is a schematic diagram of a conventional MDU 40. The MDU 40 can be the MDU 206 in the satellite TV system 20. In the MDU 40, an optical signal inputted via an optical fiber cable is converted into an electric signal by an optical receiver 400 and is outputted to an IF amplifier 402. A signal outputted from the IF amplifier 402 is respectively filtered by band-pass filters 406 and 408 to generate IF signals IF3 and IF4 with different frequency bands. The IF signal IF3 is amplified, mixed, and filtered by two different circuits respectively and converted into a vertical low polarization signal VL and a vertical high polarization signal VH. Similarly, the IF signal IF4 is also amplified, mixed, and filtered by two different circuits respectively and converted into a horizontal low polarization signal HL and a horizontal high polarization signal HH. These horizontal and vertical polarization signals VL, VH, HL, and HH are outputted to decoding devices of end-users via a multiswitch 410.

Passband ranges of filters notated in FIG. 4 are corresponding to the optical LNB 30 of FIG. 3. For performing down-converting, the MDU 40 has to use oscillators 412 and 414 to generate a 0.85 GHz oscillating signal and a 3.3 GHz oscillating signal and a mixer 416 performing signal mixing for generating a 2.45 GHz oscillating signal. In addition, the MDU 40 has to use filters 418, 420, and 422 to prevent the oscillating signals from interfering with each other. In FIG. 4, in order to implement optical fiber transmission, there are a lot of components included in the MDU 40.

Since the optical transmitter 324 in the optical LNB 30 has to convert a 5.45 GHz electric signal, which is of a high frequency, cost of a laser diode in the optical transmitter 324 is three to four times of that of a common laser diode. Also, cost of a photodetector in the optical receiver 400 of the MDU 40 is several times of that of a common photodetector. In addition, since the IF amplifier 322 in the optical LNB 30 must be able to amplify an IF signal with a frequency band range of 3.4-5.45 GHz, cost of the IF amplifier 322 is several times of that of a common IF amplifier. In summary, the satellite TV system 20 using optical fiber cables is more expensive than the traditional satellite TV system using coaxial cables.

SUMMARY OF THE INVENTION

It is therefore an objective of the claimed invention to provide an optical low-noise block downconverter (LNB), a multiple dwelling unit (MDU), and a related satellite television (TV) system.

The present invention discloses an optical LNB, which includes a first down-converting circuit, a second down-converting circuit, an oscillator, a first optical transmitter, and a second optical transmitter. The first down-converting circuit is utilized for down-converting and filtering a first polarization signal to output a first intermediate-frequency (IF) signal. The second down-converting circuit is utilized for down-converting and filtering a second polarization signal to output a second IF signal, wherein a frequency band of the first IF signal is the same as a frequency band of the second IF signal. The oscillator is coupled to the first and the second down-converting circuits and utilized for generating an oscillating signal outputted to the first down-converting circuit and the second down-converting circuit. The first optical transmitter is coupled to the first down-converting circuit and utilized for converting the first IF signal into a first optical signal. The second optical transmitter is coupled to the second down-converting circuit and utilized for converting the second IF signal into a second optical signal.

The present invention further discloses an MDU for a satellite TV system, which includes a first optical receiver, a second optical receiver, a first amplifier, a second amplifier, a first down-converting circuit, a second down-converting circuit, a third down-converting circuit, a fourth down-converting circuit, an oscillator, and a multiswitch. The first optical receiver is utilized for converting a first optical signal inputted to the MDU into a first IF signal. The second optical receiver is utilized for converting a second optical signal inputted to the MDU into a second IF signal, and a frequency band of the second IF signal is the same as a frequency band of the first IF signal. The first amplifier is coupled to the first optical receiver and utilized for amplifying the first IF signal. The second amplifier is coupled to the second optical receiver and utilized for amplifying the second IF signal. The first down-converting circuit is coupled to the first amplifier and utilized for filtering and down-converting the first IF signal for outputting a third IF signal. The second down-converting circuit is coupled to the first amplifier and utilized for filtering and down-converting the first IF signal for outputting a fourth IF signal, and a frequency band of the fourth IF signal is higher than a frequency band of the third IF signal. The third down-converting circuit is coupled to the second amplifier and utilized for filtering and down-converting the second IF signal for outputting a fifth IF signal. The fourth down-converting circuit is coupled to the second amplifier and utilized for filtering and down-converting the second IF signal for outputting a sixth IF signal, and a frequency band of the sixth IF signal is lower than a frequency band of the fifth IF signal. The oscillator is coupled to the second down-converting circuit and the third down-converting circuit and utilized for generating an oscillating signal outputted to the second down-converting circuit and the third down-converting circuit. The multiswitch is coupled to the first down-converting circuit, the second down-converting circuit, the third down-converting circuit, and the fourth down-converting circuit and utilized for transmitting the third IF signal, the fourth IF signal, the fifth IF signal, and the sixth IF signal to end-user devices of the satellite TV system.

The present invention further discloses a related satellite TV system, which includes a plurality of satellite receivers, a splitter, and a plurality of MDUs. In the plurality of satellite receivers, each of the plurality of satellite receivers includes an optical LNB, which includes a first down-converting circuit, a second down-converting circuit, an oscillator, a first optical transmitter, and a second optical transmitter. The first down-converting circuit is utilized for down-converting and filtering a first polarization signal inputted to the low-noise downconverter, for outputting a first IF signal. The second down-converting circuit is utilized for down-converting and filtering a second polarization signal inputted to the low-noise downconverter and utilized for outputting a second IF signal, and a frequency band of the first IF signal is the same as a frequency band of the second IF signal. The oscillator is coupled to the first down-converting circuit and the second down-converting circuit and utilized for generating an oscillating signal and outputting the oscillating signal to the first down-converting circuit and the second down-converting circuit. The first optical transmitter is coupled to the first down-converting circuit and utilized for converting the first IF signal into a first optical signal. The second optical transmitter is coupled to the second down-converting circuit and utilized for converting the second IF signal into a second optical signal. The splitter is coupled to the plurality of satellite receivers and utilized for transmitting the first optical signal and the second optical signal outputted from each of the plurality of satellite receivers. In the plurality of MDUs, each MDU is coupled to the splitter and an end-user device of the satellite TV system and utilized for photoelectric-converting, frequency down-converting, and filtering the first optical signal and the second optical signal outputted from each of the plurality of satellite receivers.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
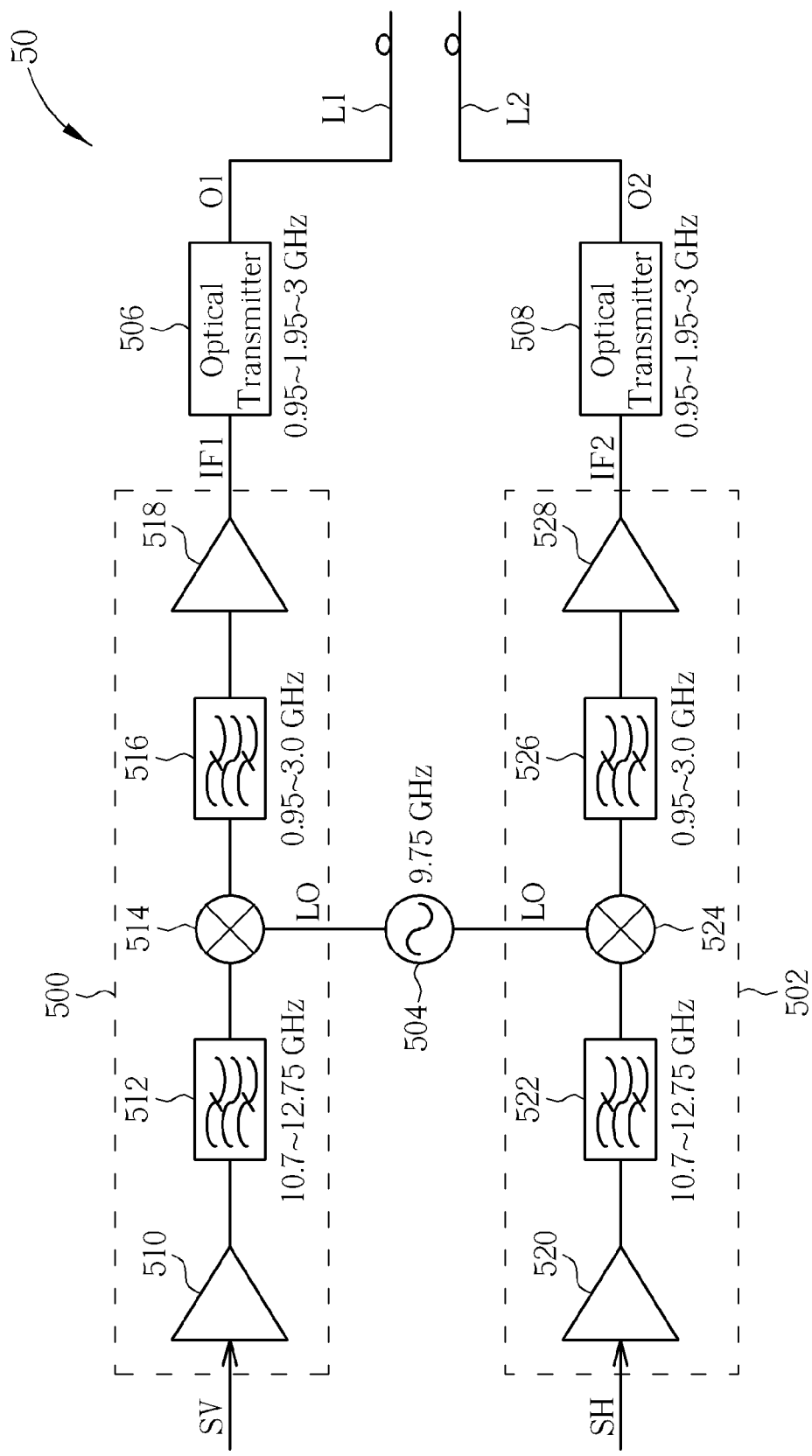
FIG. 5 and FIG. 6 are schematic diagrams of optical low-noise block downconverters according to embodiments of the present invention.

Please refer to FIG. 5, which is a schematic diagram of an optical low-noise block downconverter (LNB) 50 according to an embodiment of the present invention. The optical LNB 50 is utilized for down-converting two input signals with orthogonal polarization directions such as a vertical and a horizontal polarization signals and then converting the signals into optical signals, and the optical LNB 50 is suitable to a satellite television (TV) system transmitted via optical fibers. The optical LNB 50 in FIG. 5 is an example according to the specification of a universal LNB commonly used in Europe.

The optical LNB 50 includes down-converting circuits 500 and 502, an oscillator 504, and optical transmitters 506 and 508. The down-converting circuit 500 includes a low-noise amplifier 510, a band-pass filter 512, a mixer 514, a band-pass filter 516, and an intermediate-frequency (IF) amplifier 518, and is utilized for filtering, down-converting, and amplifying a vertical polarization signal SV inputted to the optical LNB 50, for generating an IF signal IF1. The down-converting circuit 502 includes a low-noise amplifier 520, a band-pass filter 522, a mixer 524, a band-pass filter 526, and an IF amplifier 528, and is utilized for filtering, down-converting, and amplifying a horizontal polarization signal SH inputted to the optical LNB 50, for generating another IF signal IF2. The oscillator 504 is utilized for generating an oscillating signal LO, and outputting the oscillating signal LO to the mixers 514 and 524, wherein the frequency of the oscillating signal LO is 9.75 GHz according to the specification of the universal LNB. The optical transmitters 506 and 508 are respectively coupled to the down-converting circuits 500 and 502, and are utilized for converting the IF signals IF1 and IF2 from electric signals into optical signals O1 and O2, so as to transmit the optical signals O1 and O2 via optical fibers. The optical transmitters 506 and 508 are units capable of converting an electric signal into an optical signal, and detailed elements of the optical transmitter 506 or 508, such as laser driving circuits, laser diodes, etc., are well known by those skilled in the art and are not narrated herein.

In the down-converting circuit 500, the low-noise amplifier 510 is utilized for amplifying the vertical polarization signal SV. The band-pass filter 512 is coupled to the low-noise amplifier 510, and is utilized for filtering a signal outputted from the low-noise amplifier 510 by a passband range of 10.7-12.75 GHz. The passband of the band-pass filter 512 is equal to the frequency band of a satellite TV signal that is able to be received by an end-user device of a satellite TV system, such as a Ku band exampled in FIG. 5. The mixer 514 is coupled to the band-pass filter 512 and the oscillator 504, and utilized for mixing a signal outputted from the band-pass filter 512 with the oscillating signal LO, i.e. for down-converting the signal outputted from the band-pass filter 512. The band-pass filter 516 is coupled to the mixer 514, and utilized for filtering a signal outputted from the mixer 514 by a passband range of 0.95-3.0 GHz. The IF amplifier 518 is coupled to the band-pass filter 516, and is utilized for amplifying a signal outputted from the band-pass filter 516, for generating the IF signal IF1. The IF signal IF1 is converted into the optical signal O1 by the optical transmitter 506.

The down-converting circuit 502 is similar to the down-converting circuit 500. The low-noise amplifier 520 is utilized for amplifying the horizontal polarization signal SH. The band-pass filter 522 is coupled to the low-noise amplifier 520, and is utilized for filtering a signal outputted from the low-noise amplifier 520 by a passband range of 10.7-12.75 GHz. The mixer 524 is coupled to the band-pass filter 522 and the oscillator 504, and is utilized for mixing a signal outputted from the band-pass filter 522 and the oscillating signal LO. The band-pass filter 526 is coupled to the mixer 524, and is utilized for filtering a signal outputted from the mixer 524 by a passband range of 0.95-3.0 GHz. The IF amplifier 528 is coupled to the band-pass filter 526, and is utilized for amplifying a signal outputted from the band-pass filter 526, for generating the IF signal IF2. The IF signal IF2 is converted into the optical signal O2 by the optical transmitter 508.

Figure 3:
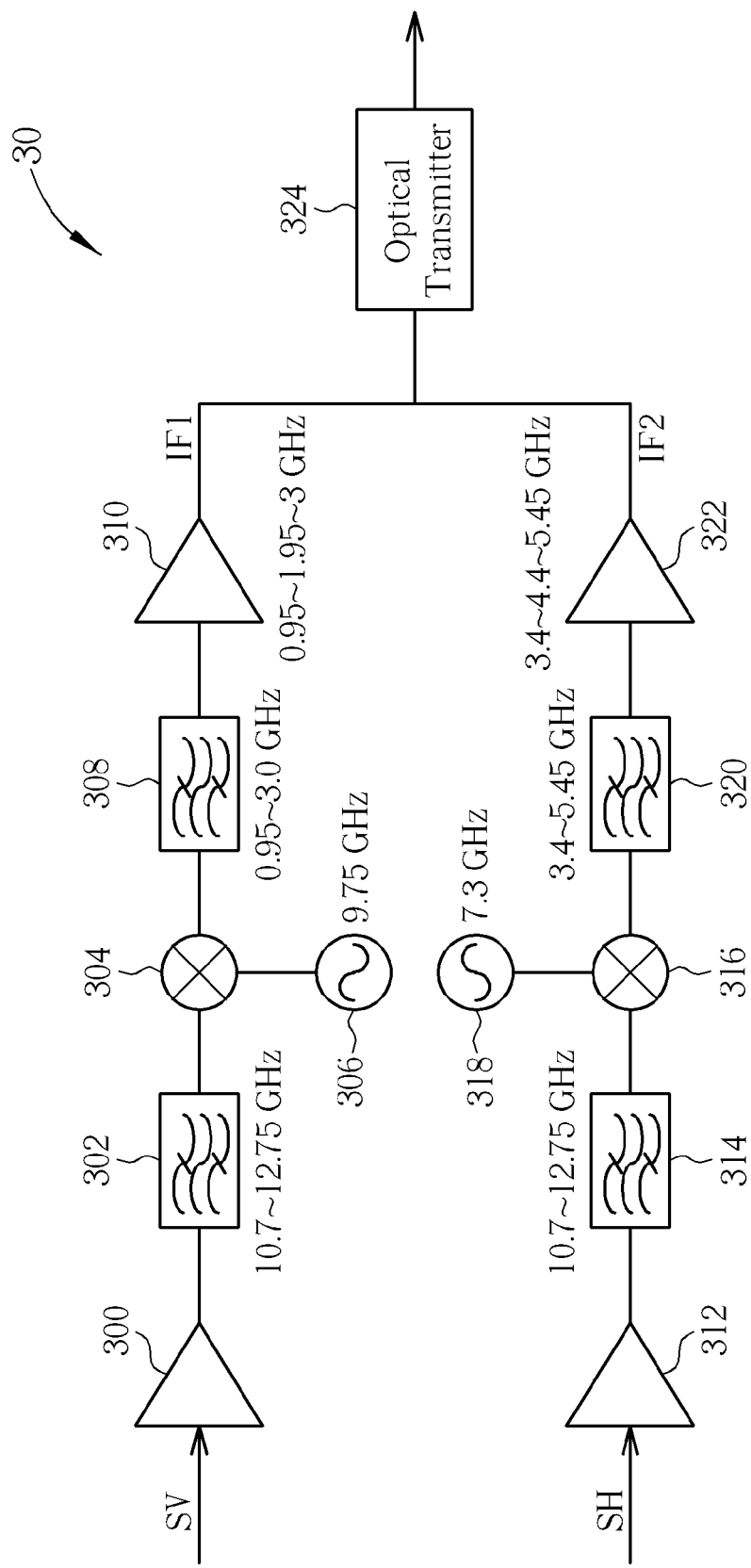
FIG. 3 is a schematic diagram of a conventional optical low-noise block down-converter.

The conventional optical LNB 30 of FIG. 3 uses two oscillators for providing two different oscillating signals and down-converts a vertical and a horizontal polarization signals into signals with different frequency bands range of 0.95-3.0 GHz and 3.4-5.45 GHz. In comparison, the optical LNB 50 according to the present invention uses only an oscillator and down-converts both of the vertical and the horizontal polarization signals into signals with the same frequency band range of 0.95-3.0 GHz. The number and cost of oscillators used for the optical LNB 50 are obviously reduced according to the present invention. Besides, the IF amplifier 322 of the conventional optical LNB 30 must have an operating frequency range of 3.4-5.45 GHz, which is not commonly used in LNB related products and has an expensive cost. In contrast, because the optical LNB 50 down-converts the vertical and the horizontal polarization signals into IF signals with the frequency band range of 0.95-3.0 GHz, considerably lower than 3.4-5.45 GHz, the optical LNB 50 can use a common and cheaper IF amplifier having an operating frequency range of 0.95-3.0 GHz to implement the IF amplifiers 518 and 528 for cost reduction.

The optical transmitter 324 of the conventional optical LNB 30 must be capable of converting an electric signal of high frequency 5.45 GHz, and therefore the optical transmitter 324 cannot use a common laser diode conforming to the optical fiber transmission specification OC-48 (optical transmission rate 2.488 Gbps) and can only use a laser diode with a higher optical transmission rate and more expensive cost. On the contrary, since the IF signals IF1 and IF2 generated in the optical LNB 50 are with a frequency band range of 0.95-3.0 GHz and a laser diode conforming to OC-48 supports an optical transmission rate up to 3 Gbps, the laser diode conforming to OC-48 can be used in the optical transmitters 506 and 508. Although the optical transmitters 506 and 508 use two laser diodes, the optical transmitters 506 and 508 still have lower cost and higher economy efficiency than the optical transmitter 324 of the conventional optical LNB 30.

In short, the key point of the optical LNB according to the present invention is to generate an oscillating signal by using only one oscillator, and to down-convert two orthogonal polarization signals into signal with the same frequency band. Therefore, the optical transmitter can be implemented by components conforming to the general optical fiber transmission specification for significantly reducing costs.

Please note that, the type of the polarization signals, the passband of the band-pass filters, and the frequency of the oscillating signal of the optical LNB 50 are examples according to the specification of the universal LNB, but not limited to the present invention. The optical LNB 50 can be further designed according to the specification of another LNB, and the corresponding component characteristics of band-pass filters and the oscillator can be adjusted according to the selected specification. Orthogonal polarization signals received by the optical LNB 50 are not restricted to linear polarization signals, and can be circular polarization signals as well. The down-converting circuits 500 and 502 are embodiments of the present invention, and in another embodiment, the number of components in the down-converting circuits, such as band-pass filters, low-noise amplifiers, etc., can be increased or decreased or the location of the components can be modified according to requirements.

In FIG. 5, the optical signals O1 and O2 outputted from the optical LNB 50 are respectively transmitted to a back-end equipment, such as a headend equipment of a satellite TV system, and a transmission channel for each optical signal is independent. That is, the optical LNB 50 outputs the optical signals O1 and O2 by channel division multiplexing. Whether the wavelength of the optical signals O1 and O2 are the same would not affect signal reception of the back-end equipment. An optical fiber cable connecting the optical LNB 50 and the back-end equipment has to include at least two optical fibers.

Figure 6:
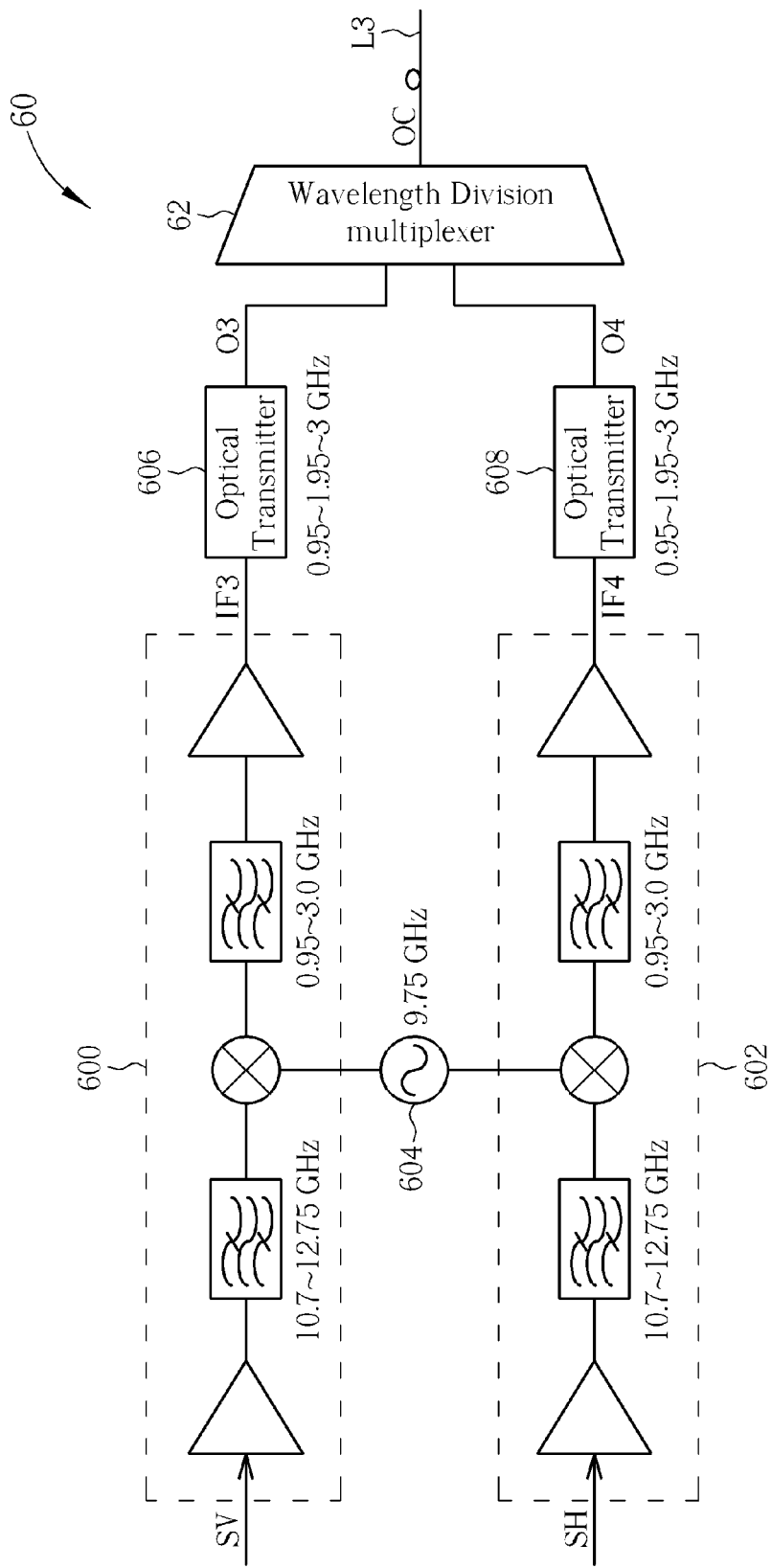

Please refer to FIG. 6, which is a schematic diagram of an optical LNB 60 according to an embodiment of the present invention. The optical LNB 60 includes down-converting circuits 600 and 602, an oscillator 604, and optical transmitters 606 and 608. Operations and component connections of the down-converting circuits 600 and 602 and the oscillator 604 are the same as the corresponding components in FIG. 5, and therefore notations of the components included in the down-converting circuits 600 and 602 are omitted. Please refer to the optical LNB 50 as mentioned above for realizing details of the down-converting circuits 600 and 602 and the oscillator 604. The optical transmitters 606 and 608 are respectively coupled to the down-converting circuits 600 and 602. A laser diode in the optical transmitter 606 and a laser diode in the optical transmitter 608 are different for respectively converting IF signals IF3 and IF4 outputted from the down-converting circuits 600 and 602 into optical signals O3 and O4 with different wavelengths. From the above, the optical LNB 60 outputs an optical signal by wavelength division multiplexing (WDM) rather than channel division multiplexing, which is a main difference between the optical LNB 50 and the optical LNB 60. In FIG. 6, the optical transmitters 606 and 608 are further coupled to a wavelength division multiplexer 62, which is utilized for combining the optical signals O3 and O4 into an optical signal OC to be transmitted via an optical fiber L3. Hence, the optical fiber cable connecting the optical LNB 60 and the back-end equipment can include only one optical fiber (L3) for transmission of the optical signal OC.

Figure 1:
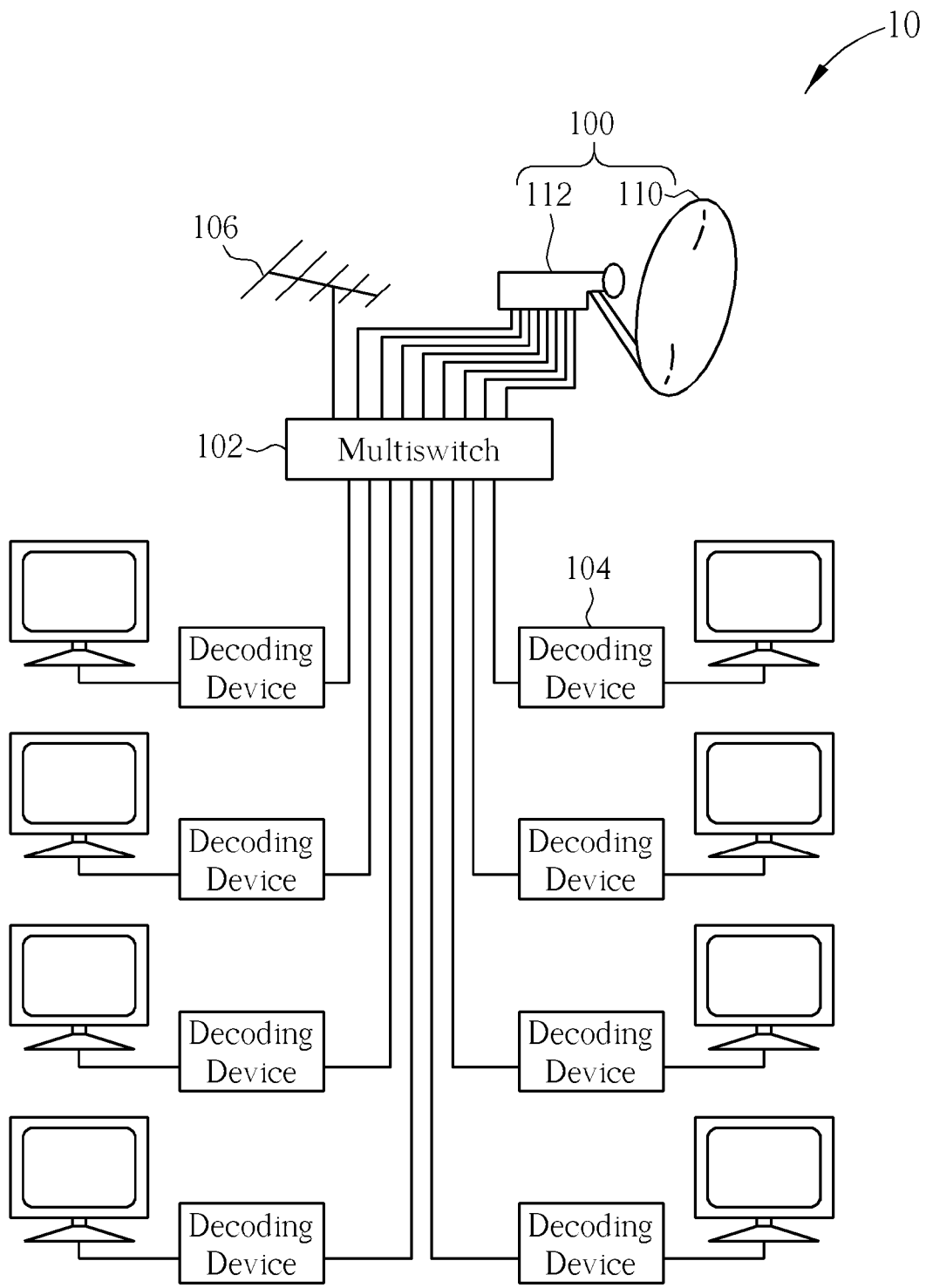
FIG. 1 and FIG. 2 are schematic diagrams of conventional satellite television systems.
Figure 2:
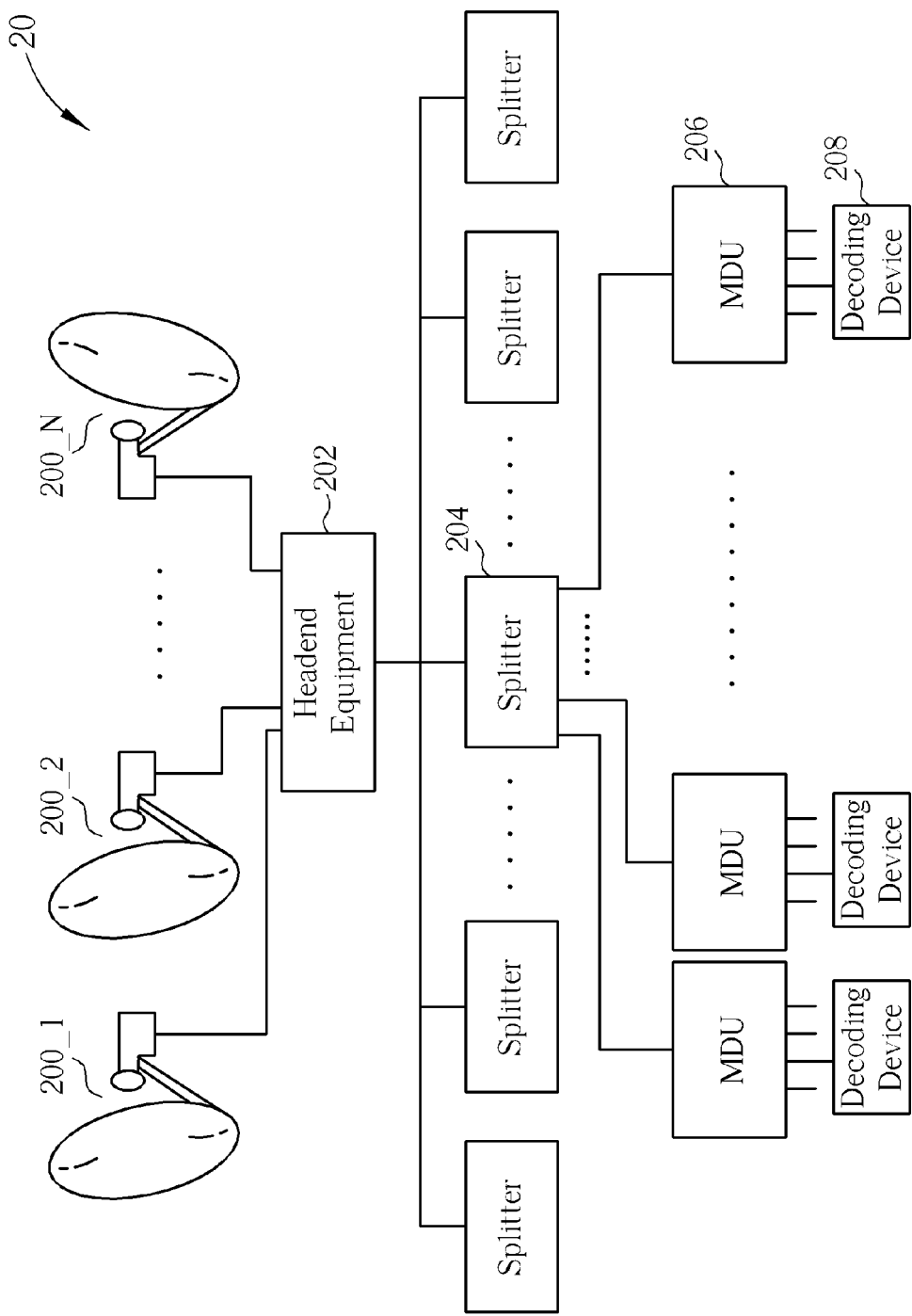
Figure 7:
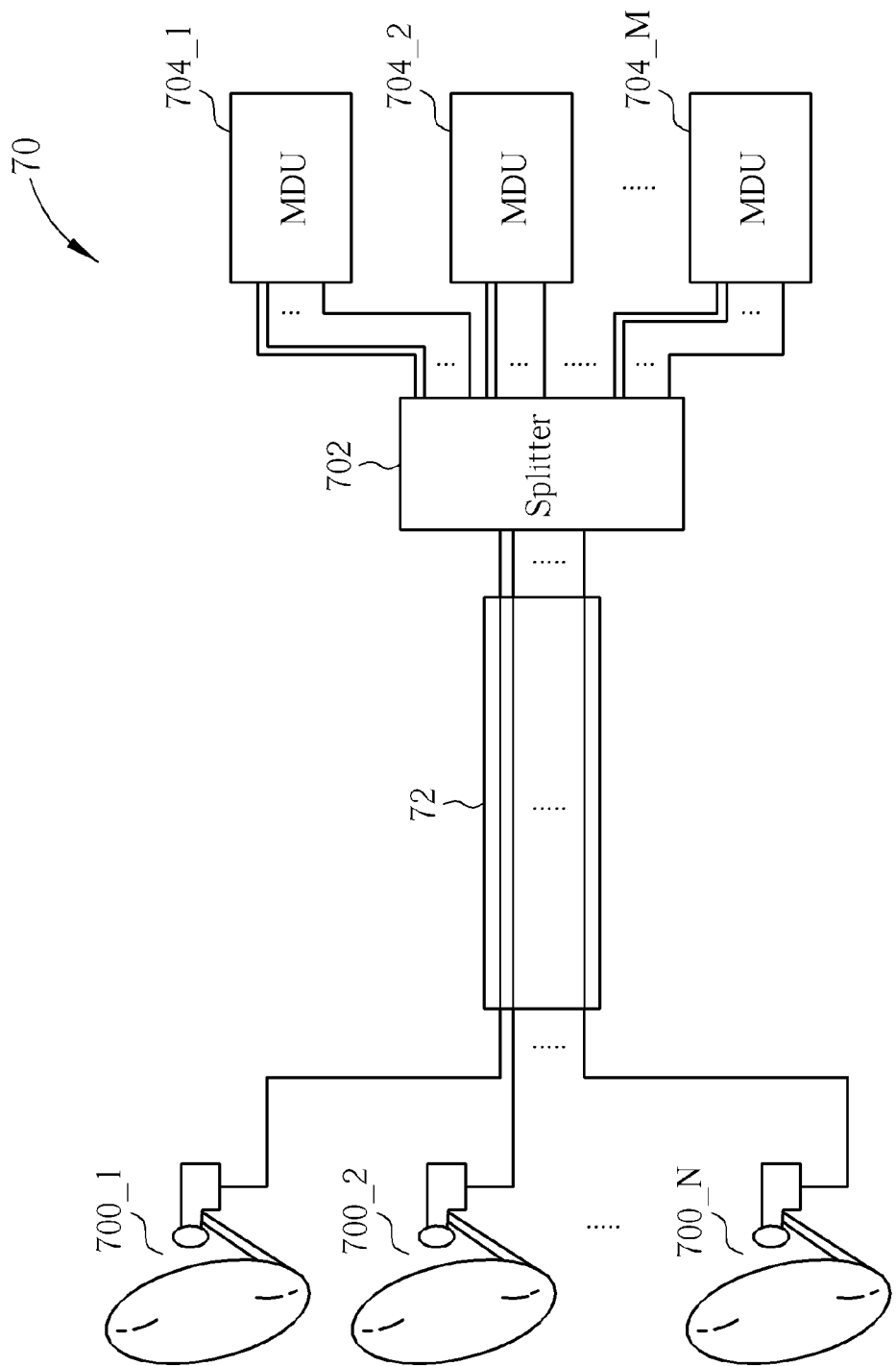
FIG. 7 is a schematic diagram of a satellite television system according to an embodiment of the present invention.

The optical LNB 50 and the optical LNB 60 can be applied to a satellite TV system capable of receiving multiple satellite signals or a satellite master antenna TV system of FIG. 1. Please refer to FIG. 7, which is a schematic diagram of a satellite TV system 70 according to an embodiment of the present invention. The satellite TV system 70 uses channel division multiplexing for realizing optical transmission. The satellite TV system 70 includes satellite receivers 700_1-700_N, a splitter 702, and multiple dwelling units (MDUs) 704_1-704_M. Each of the satellite receivers 700_1-700_N uses the optical LNB 50 to down-convert a satellite signal and convert an electric signal into an optical signal.

In the satellite receivers 700_1-700_N, each satellite receiver outputs two optical signals, and a total of 2N optical signals are transmitted to the splitter 702 via an optical fiber cable 72 including at least 2N optical fibers. The splitter 702 includes 2N input ports and 2N×M output ports, and is utilized for transmitting the 2N optical signals to each of the MDUs 704_1-704_M. Each MDU is utilized for performing photoelectric-converting, amplifying, down-converting, and filtering on the received 2N optical signals and generating an electric signal suitable to be received by decoding devices of end-users. Note that, FIG. 7 aims to describe the satellite TV system 70 receiving satellite signals from multiple satellites and transmitting the corresponding optical signals by channel division multiplexing; in practice, a terrestrial TV signal or a digital broadcasting signal can also be converted into an optical signal and be transmitted along with the optical signal corresponding to the satellite signals via the same optical fiber cable, which is not included in the present invention and is not given herein.

Figure 8:
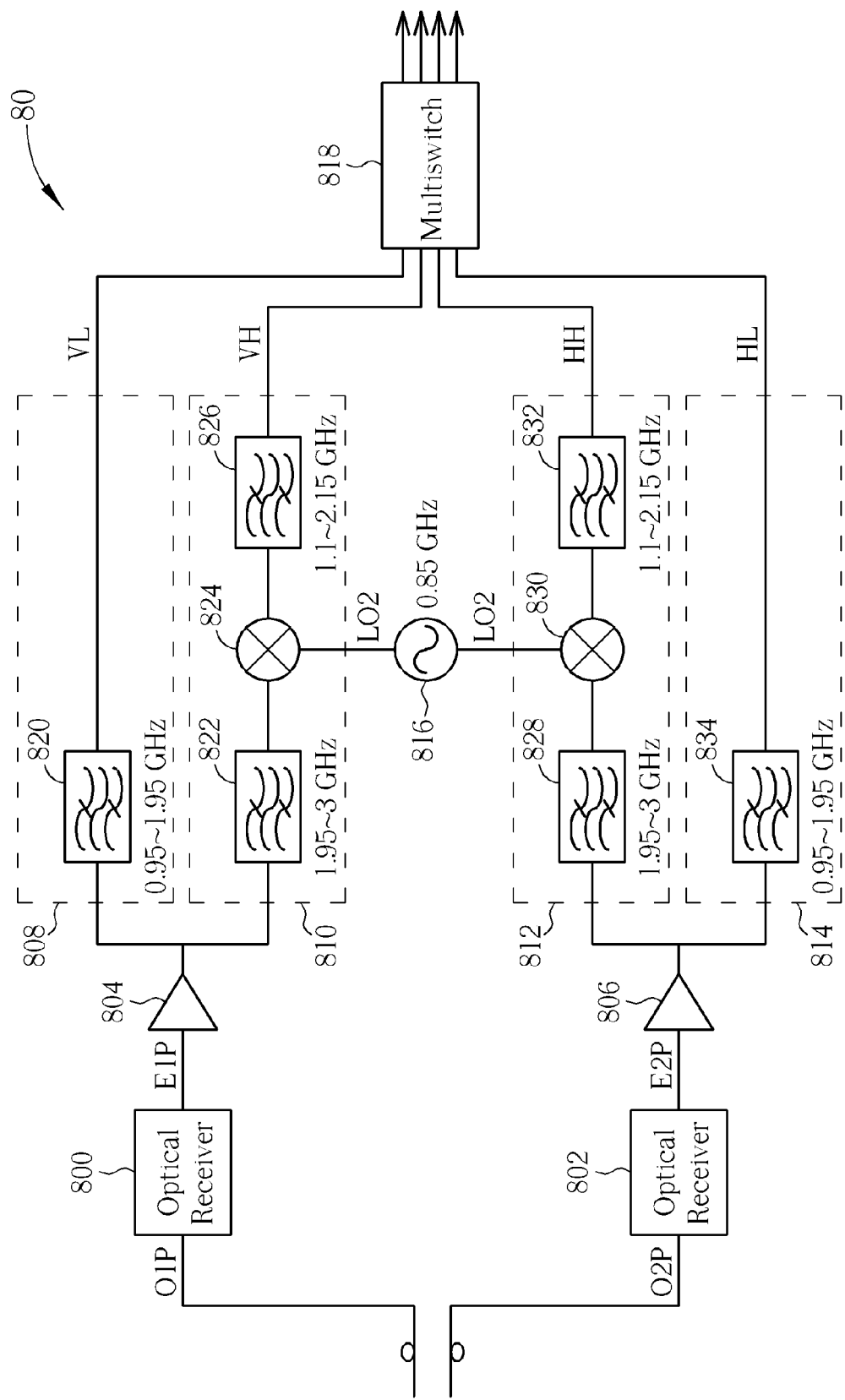
FIG. 8 is a schematic diagram of a multiple dwelling unit according to an embodiment of the present invention.

Circuit characteristics of the MDUs 704_1-704_M, such as the passband of a filter or the operating frequency of an oscillator, are designed for conforming to the optical LNB 50. Please refer to FIG. 8, which is a schematic diagram of an MDU 80 according to an embodiment of the present invention. The MDU 80 can be used to implement the MDU in the satellite TV system 70 of FIG. 7 and operates along with the optical LNB 50. The MDU 80 includes optical receivers 800 and 802, IF amplifiers 804 and 806, down-converting circuits 808, 810, 812, and 814, an oscillator 816, and a multiswitch 818. For example, if the MDU 80 is applied to the satellite TV system 70, the optical receivers 800 and 802 are utilized for respectively receiving optical signals O1P and O2P, which are outputted from one of the satellite receivers 700_1-700_N and transmitted through the splitter 702, and for converting the optical signals O1P and O2P into IF signals E1P and E2P. The IF amplifiers 804 and 806 are respectively coupled to the optical receivers 800 and 802 and utilized for amplifying the IF signals E1P and E2P. The down-converting circuits 808, 810, 812, and 814 are utilized for down-converting and filtering signals outputted from the IF amplifiers 804 and 806, to generate signals suitable to be received by decoding devices of end-users. Details are described below. The oscillator 816 is utilized for generating a 0.85 GHz oscillating signal LO2 used by the down-converting circuits 810 and 812.

The down-converting circuit 808 includes a band-pass filter 820, which is coupled to the IF amplifier 804 and utilized for filtering a signal outputted from the IF amplifier 804 by a passband range of 0.95-1.95 GHz and outputting a vertical low polarization signal VL. The down-converting circuit 810 includes a band-pass filter 822, a mixer 824, and a band-pass filter 826. The band-pass filter 822 is coupled to the IF amplifier 804 and utilized for filtering a signal outputted from the IF amplifier 804 by a passband range of 1.95-3.0 GHz. The mixer 824 is coupled to the band-pass filter 822 and the oscillator 816, and utilized for mixing a signal outputted from the band-pass filter 822 with the oscillating signal LO2, i.e. for downing-converting the signal outputted from the band-pass filter 822. The band-pass filter 826 is coupled to the mixer 824 and utilized for filtering a signal outputted from the mixer 824 by a passband range of 1.1-2.15 GHz and outputting a vertical high polarization signal VH.

The down-converting circuit 812 is similar to the down-converting circuit 810 and includes a band-pass filter 828, a mixer 830, and a band-pass filter 832. The band-pass filter 828 is coupled to the IF amplifier 806 and utilized for filtering a signal outputted from the IF amplifier 806 by a passband range of 1.95-3.0 GHz. The mixer 830 is coupled to the band-pass filter 828 and the oscillator 816, and utilized for mixing a signal outputted from the band-pass filter 828 with the oscillating signal LO2, i.e. for down-converting the signal outputted from the band-pass filter 828. The band-pass filter 832 is coupled to the mixer 830 and utilized for filtering a signal outputted from the mixer 830 by a passband range of 1.1-2.15 GHz and outputting a horizontal high polarization signal HH. The down-converting circuit 814 includes a bandpass filter 834 coupled to the IF amplifier 806, which is utilized for filtering a signal outputted from the IF amplifier 806 by a passband range of 0.95-1.95 GHz and outputting a horizontal low polarization signal HL. The multiswitch 818 is coupled to the down-converting circuits 808, 810, 812, and 814, and utilized for transmitting the vertical low polarization signal VL, the vertical high polarization signal VH, the horizontal high polarization signal HH, and the horizontal low polarization signal HL to the back-end equipment of the MDU 80 as decoding devices of end-users, such as set up boxes. Note that, components included in the down-converting circuits 808, 810, 812, and 814 are embodiments of the present invention, and those skilled in the art can make proper modifications or alterations accordingly, such as increasing or decreasing the number of the components, modifying the positions of the components, etc.

Note that, the MDU 80 is utilized for processing two signals transmitted from a single satellite receiver, and thus if in a satellite TV system including multiple satellite receivers, the corresponding MDU consists of multiple MDUs 80. For example, for the satellite TV system 70 of FIG. 7 including N satellite receivers, each of the MDUs 704_1-704_M consists of N MDUs 80.

Figure 4:
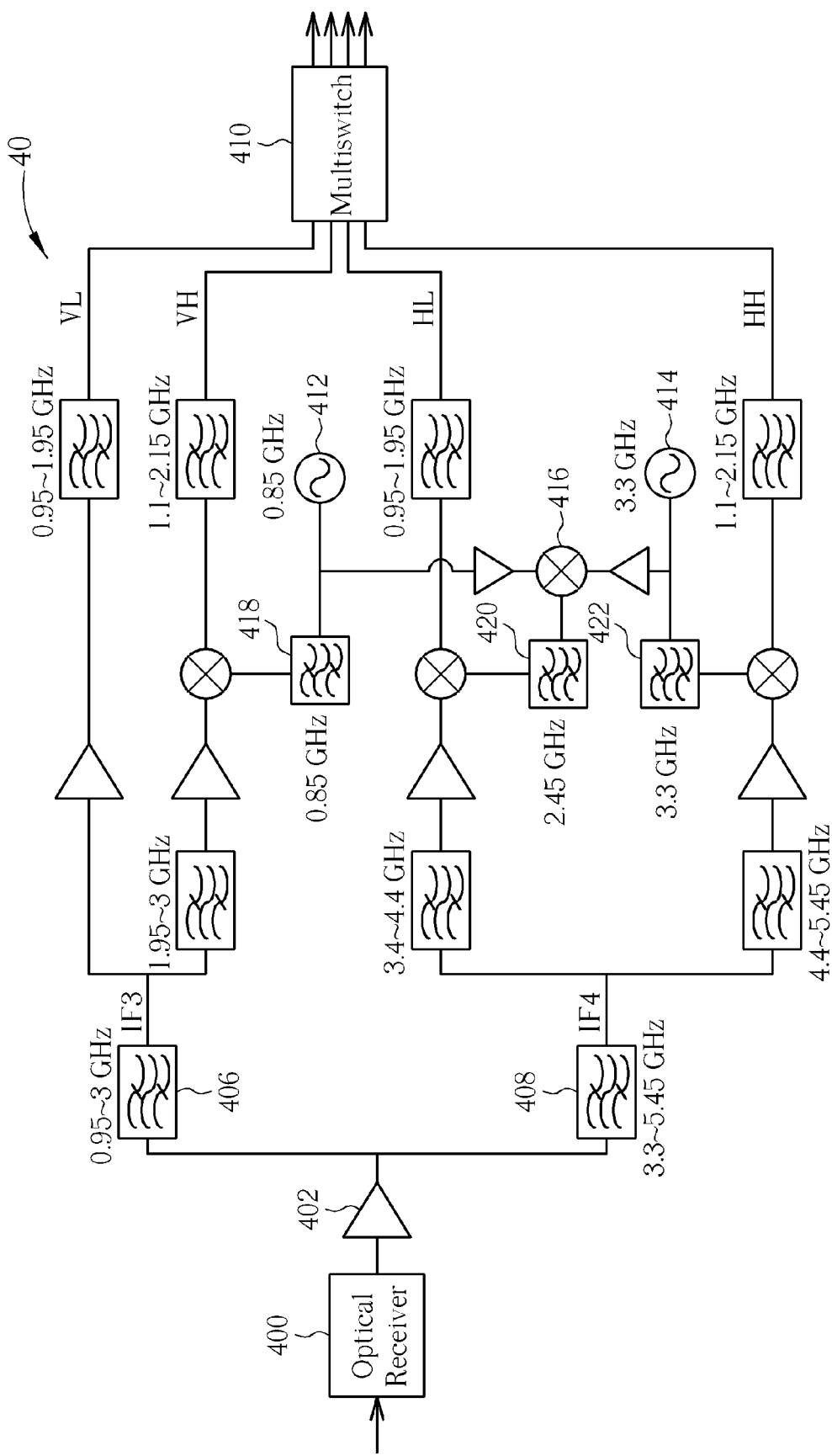
FIG. 4 is a schematic diagram of a conventional multiple dwelling unit.

In FIG. 4, an optical signal is inputted to the conventional MDU 40 via an optical fiber channel. That is, the MDU 40 needs more filters to down-convert an IF signal with a wider frequency band range of 0.95-5.45 GHz into IF signals with narrower frequency bands and needs two oscillators and a mixer to generate three oscillating signals with different frequencies, so as to down-convert the IF signals with different frequency bands. On the contrary, because the MDU 80 is applied to a satellite TV system along with the optical LNB 50 in the present invention and the optical signal is transmitted to the MDU 80 by channel division multiplexing, each optical signal transmitted via an optical fiber channel is with a lower frequency band range of 0.95-3.0 GHz. Hence, only an oscillator is required for the MDU 80 of the present invention to down-convert an IF signal into a signal capable of being received by decoding devices. Compare FIG. 4 with FIG. 8, numbers of oscillators and filters in the MDU 80 are significantly less than those in the conventional MDU 40. Under such a situation, cost of the MDU 80 is reduced, and cost of a satellite TV system is also reduced.

Figure 9:
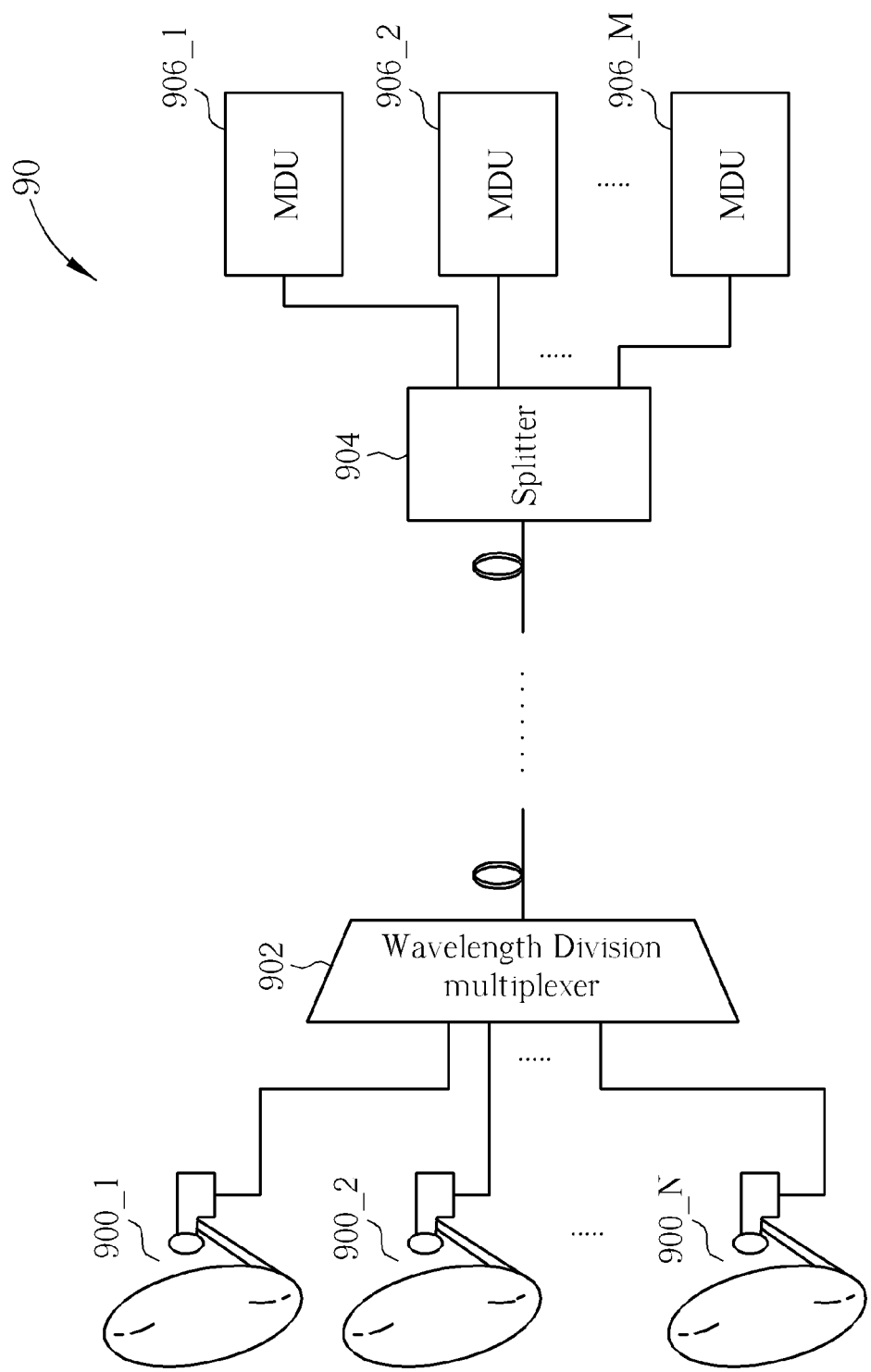
FIG. 9 is a schematic diagram of a satellite television system according to another embodiment of the present invention.

Please refer to FIG. 9, which is a schematic diagram of a satellite TV system 90 according to an embodiment of the present invention. The satellite TV system 90 uses wavelength division multiplexing for realizing optical transmission. The satellite TV system 90 includes satellite receivers 900_1-900_N, a wavelength division multiplexer 902, a splitter 904, and MDUs 906_1-906_M. Each of the satellite receiver 900_1-900_N uses the optical LNB 60 of FIG. 6 to perform down-converting and electric-photo converting for a satellite signal. In the satellite receivers 900_1-900_N, each satellite receiver outputs two optical signals with different wavelengths, and the satellite receivers 900_1-900_N output a total of 2N optical signals with different wavelengths to the wavelength division multiplexer 902. The wavelength division multiplexer 902 combines the 2N optical signals into an optical signal OC to be transmitted via an optical fiber. The splitter 904 includes an input port and M output ports and is utilized for transmitting the optical signal OC to each of the MDUs 906_1-906_M. Each of the MDUs 906_1-906_M is utilized for performing photoelectric-converting, down-converting, amplifying, and filtering on the optical signal OC and generating vertical and horizontal polarization signals with different frequency bands that is suitable to be received by decoding devices of end-users.

Figure 10:
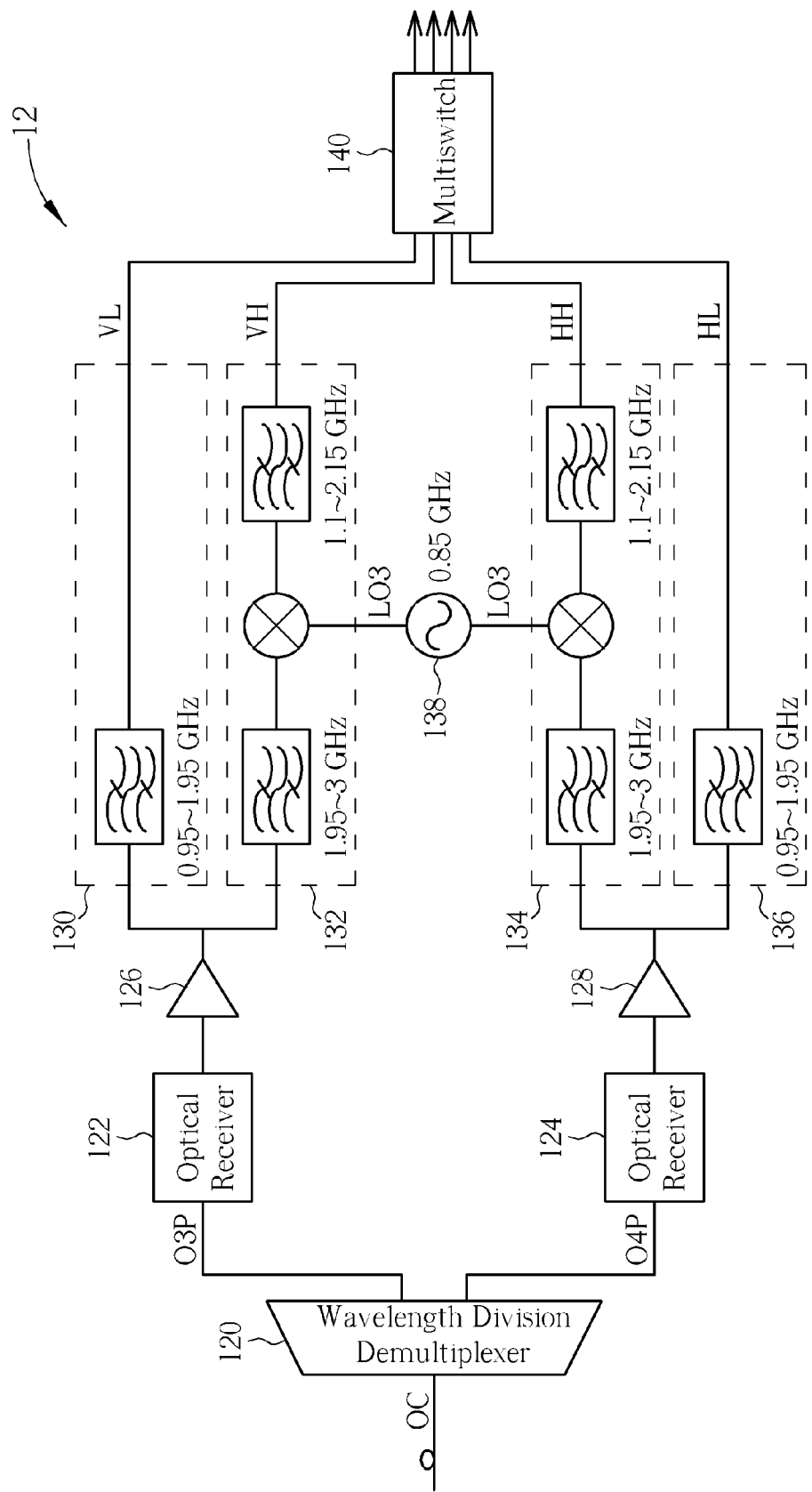
FIG. 10 is a schematic diagram of a multiple dwelling unit according to another embodiment of the present invention.

Please refer to FIG. 10, which is a schematic diagram of an MDU 12 according to an embodiment of the present invention. The MDU 12 can be an MDU in the satellite TV system 90 of FIG. 9 and operate along with the optical LNB 60 of FIG. 6. The MDU 12 includes a wavelength division demultiplexer 120, optical receivers 122 and 124, IF amplifiers 126 and 128, down-converting circuits 130, 132, 134, and 136, an oscillator 138, and a multiswitch 140. For example, if the MDU 12 is applied to the satellite TV system 90, the wavelength division demultiplexer 120 is utilized for separating the optical signal OC outputted from the wavelength division multiplexer 902 into optical signals O3P and O4P with different wavelengths. The optical receivers 122 and 124 is coupled to the wavelength division demultiplexer 120 and utilized for respectively photo-electric converting the optical signals O3P and O4P into IF signals. The IF amplifiers 126 and 128 are respectively coupled to the optical receivers 122 and 124 and utilized for respectively amplifying the IF signals outputted from the optical receivers 122 and 124. Components and operations of the down-converting circuits 130, 132, 134, and 136 are the same as those of the down-converting circuits 808, 810, 812, and 814 of the MDU 80 in FIG. 8, and notations of components of the down-converting circuits 130, 132, 134, and 136 are omitted in FIG. 10. The oscillator 138 is utilized for generating a 0.85 GHz oscillating signal LO3 used by the down-converting circuits 132 and 134.

Units included in the MDU 12 except of the wavelength division demultiplexer 120 are similar to the corresponding units of the MDU 80, and thus are not narrated herein. Similar to the MDU 80, the MDU 12 has advantages of simple architecture and low cost helpful to reduce the cost of a satellite TV system.

To sum up, the optical LNB according to the embodiment of the present invention uses a single oscillator to perform down-converting, which simplifies the complex architecture of the conventional optical LNB, and transmits an optical signal by channel division multiplexing or wavelength division multiplexing. Similarly, the MDU according to the embodiment of the present invention uses a single oscillator to perform down-converting. Hence, photoelectric components and IF amplifiers used in the optical LNB and the MDU can be implemented by common components for reducing the cost. At the same time, the cost of a satellite TV system using the LNB and the MDU according to the embodiments of the present invention is reduced as well.

Those skilled in the art will readily observe that numerous modifications and alterations of the device and method may be made while retaining the teachings of the invention.

What is claimed is:

1. An optical low-noise block downconverter comprising:
   a first down-converting circuit, for down-converting and filtering a first polarization signal to output a first intermediate-frequency (IF) signal;
   a second down-converting circuit, for down-converting and filtering a second polarization signal to output a second IF signal, wherein a frequency band of the first IF signal is the same as a frequency band of the second IF signal and a polarization of the first IF signal and a polarization of the second IF signal are orthogonal;
   an oscillator coupled to the first and the second down-converting circuits, for generating an oscillating signal outputted to the first down-converting circuit and the second down-converting circuit;

a first optical transmitter coupled to the first down-converting circuit, for converting the first IF signal into a first optical signal; and a second optical transmitter coupled to the second down-converting circuit, for converting the second IF signal into a second optical signal.

2. The optical low-noise block downconverter of claim 1, wherein the first optical signal and the second optical signal are respectively transmitted via different optical fibers.

3. The optical low-noise block downconverter of claim 1, wherein the first optical transmitter and the second optical transmitter are further coupled to a wavelength division multiplexer for combining the first optical signal with the second optical signal to generate a third optical signal transmitted via an optical fiber.

4. The optical low-noise block downconverter of claim 1, wherein the first down-converting circuit comprises:

a first amplifier, for amplifying the first polarization signal;

a first band-pass filter coupled to the first amplifier, for filtering a signal outputted from the first amplifier by a first passband;

a mixer coupled to the first band-pass filter and the oscillator, for mixing a signal outputted from the first band-pass filter with the oscillating signal;

a second band-pass filter coupled to the mixer, for filtering a signal outputted from the mixer by a second passband; and a second amplifier coupled to the second band-pass filter, for amplifying a signal outputted from the second band-pass filter and outputting the signal to the first optical transmitter.

5. The optical low-noise block downconverter of claim 1, wherein the second down-converting circuit comprises:

a first amplifier, for amplifying the second polarization signal;

a first band-pass filter coupled to the first amplifier, for filtering a signal outputted from the first amplifier by a first passband;

a mixer coupled to the first band-pass filter and the oscillator, for mixing a signal outputted from the first band-pass filter with the oscillating signal;

a second band-pass filter coupled to the mixer, for filtering a signal outputted from the mixer by a second passband; and a second amplifier coupled to the second band-pass filter, for amplifying a signal from the second band-pass filter and outputting the signal to the second optical transmitter.

6. A multiple dwelling unit (MDU) for a satellite television (TV) system comprising:

a first optical receiver, for converting a first optical signal inputted to the MDU into a first intermediate-frequency (IF) signal;

a second optical receiver, for converting a second optical signal inputted to the MDU into a second IF signal, wherein a frequency band of the second IF signal is the same as a frequency band of the first IF signal;

a first amplifier coupled to the first optical receiver, for amplifying the first IF signal;

a second amplifier coupled to the second optical receiver, for amplifying the second IF signal;

a first down-converting circuit coupled to the first amplifier, for filtering and down-converting the first IF signal for outputting a third IF signal;

a second down-converting circuit coupled to the first amplifier, for filtering and down-converting the first IF signal for outputting a fourth IF signal, wherein a frequency band of the fourth IF signal is higher than a frequency band of the third IF signal;

a third down-converting circuit coupled to the second amplifier, for filtering and down-converting the second IF signal for outputting a fifth IF signal;

a fourth down-converting circuit coupled to the second amplifier, for filtering and down-converting the second IF signal for outputting a sixth IF signal, wherein a frequency band of the sixth IF signal is lower than a frequency band of the fifth IF signal;

an oscillator coupled to the second down-converting circuit and the third down-converting circuit, for generating an oscillating signal outputted to the second down-converting circuit and the third down-converting circuit; and a multiswitch coupled to the first down-converting circuit, the second down-converting circuit, the third down-converting circuit, and the fourth down-converting circuit, for transmitting the third IF signal, the fourth IF signal, the fifth IF signal, and the sixth IF signal to end-user devices of the satellite TV system.

7. The MDU of claim 6, wherein the first optical signal and the second optical signal are respectively transmitted to the first optical receiver and the second optical receiver via different optical fibers.

8. The MDU of claim 6, wherein a wavelength of the first optical signal is different from a wavelength of the second optical signal.

9. The MDU of claim 8, wherein the first optical signal and the second optical signal are respectively outputted from a wavelength division demultiplexer, which is coupled to the first optical receiver and the second optical receiver and utilized for dividing a third optical signal into the first optical signal and the second optical signal, to the first optical receiver and the second optical receiver.

10. The MDU of claim 6, wherein the first down-converting circuit comprises a band-pass filter coupled to the first amplifier and utilized for filtering a signal outputted from the first amplifier by a first passband, for outputting the third IF signal.

11. The MDU of claim 6, wherein the second down-converting circuit comprises:

a first band-pass filter coupled to the first amplifier, for filtering a signal outputted from the first amplifier by a first passband;

a mixer coupled to the first band-pass filter and the oscillator, for mixing a signal outputted from the first band-pass filter with the oscillating signal; and a second band-pass filter coupled to the mixer, for filtering a signal outputted from the mixer by a second passband for outputting the fourth IF signal.

12. The MDU of claim 6, wherein the third down-converting circuit comprises:

a first band-pass filter coupled to the second amplifier, for filtering a signal outputted from the second amplifier by a first passband;

a mixer coupled to the first band-pass filter and the oscillator, for mixing a signal outputted from the first band-pass filter with the oscillating signal; and a second band-pass filter coupled to the mixer, for filtering a signal outputted from the mixer by a second passband for outputting the fifth IF signal.

13. The MDU of claim 6, wherein the fourth down-converting circuit comprises a band-pass filter coupled to the second amplifier, for filtering a signal outputted from the second amplifier by a first passband for outputting the sixth IF signal.

14. A satellite television (TV) system comprising:
a plurality of satellite receivers, each of the plurality of satellite receivers comprising an optical low-noise downconverter comprising:
  a first down-converting circuit, for down-converting and filtering a first polarization signal inputted to the low-noise downconverter, for outputting a first intermediate-frequency (IF) signal;
  a second down-converting circuit, for down-converting and filtering a second polarization signal, inputted to the low-noise downconverter, for outputting a second IF signal, wherein a frequency band of the first IF signal is the same as a frequency band of the second IF signal and a polarization of the first IF signal and a polarization of the second IF signal are orthogonal;
  an oscillator coupled to the first down-converting circuit and the second down-converting circuit, for generating an oscillating signal and outputting the oscillating signal to the first down-converting circuit and the second down-converting circuit;
  a first optical transmitter coupled to the first down-converting circuit, for converting the first IF signal into a first optical signal; and
  a second optical transmitter coupled to the second down-converting circuit, for converting the second IF signal into a second optical signal;
  a splitter coupled to the plurality of satellite receivers, for transmitting the first optical signal and the second optical signal outputted from each of the plurality of satellite receivers; and
  a plurality of multiple dwelling units (MDUs), each MDU coupled to the splitter and an end-user device of the satellite TV system and utilized for photoelectric-converting, frequency down-converting, and filtering the first optical signal and the second optical signal outputted from each of the plurality of satellite receivers.

15. The satellite TV system of claim 14, wherein the first optical signal and the second optical signal are respectively transmitted via different optical fibers.

16. The satellite TV system of claim 14, wherein the first optical transmitter and the second optical transmitter of the optical low-noise downconverter are further coupled to a wavelength division multiplexer for combining the first optical signal with the second optical signal to generate a third optical signal transmitted via an optical fiber.

17. The satellite TV system of claim 16, wherein each of the MDUs comprises a wavelength division demultiplexer for dividing the third signal into the first optical signal and the second optical signal.

\* \* \* \* \*